Patented Sept. 22, 1925.

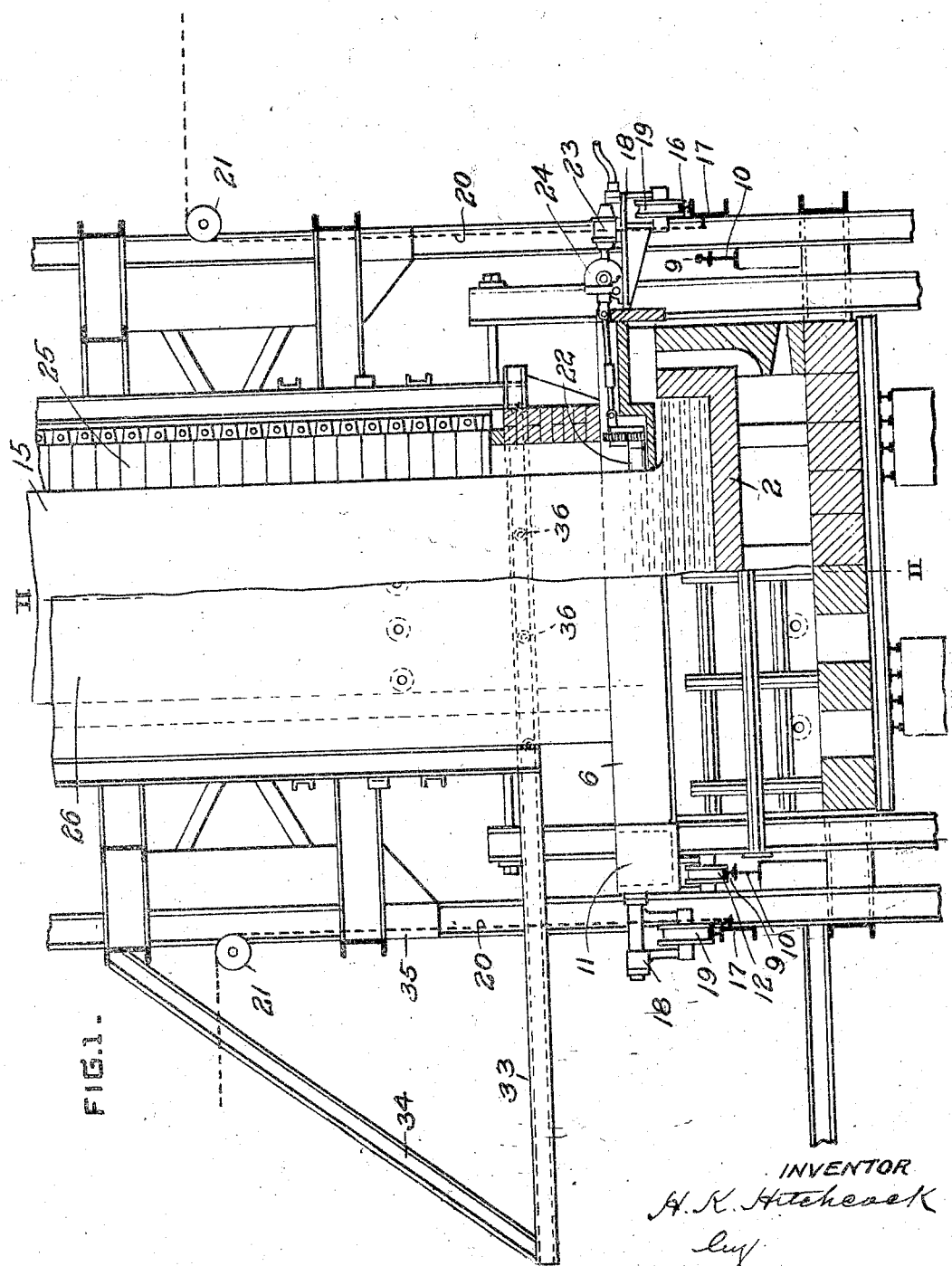

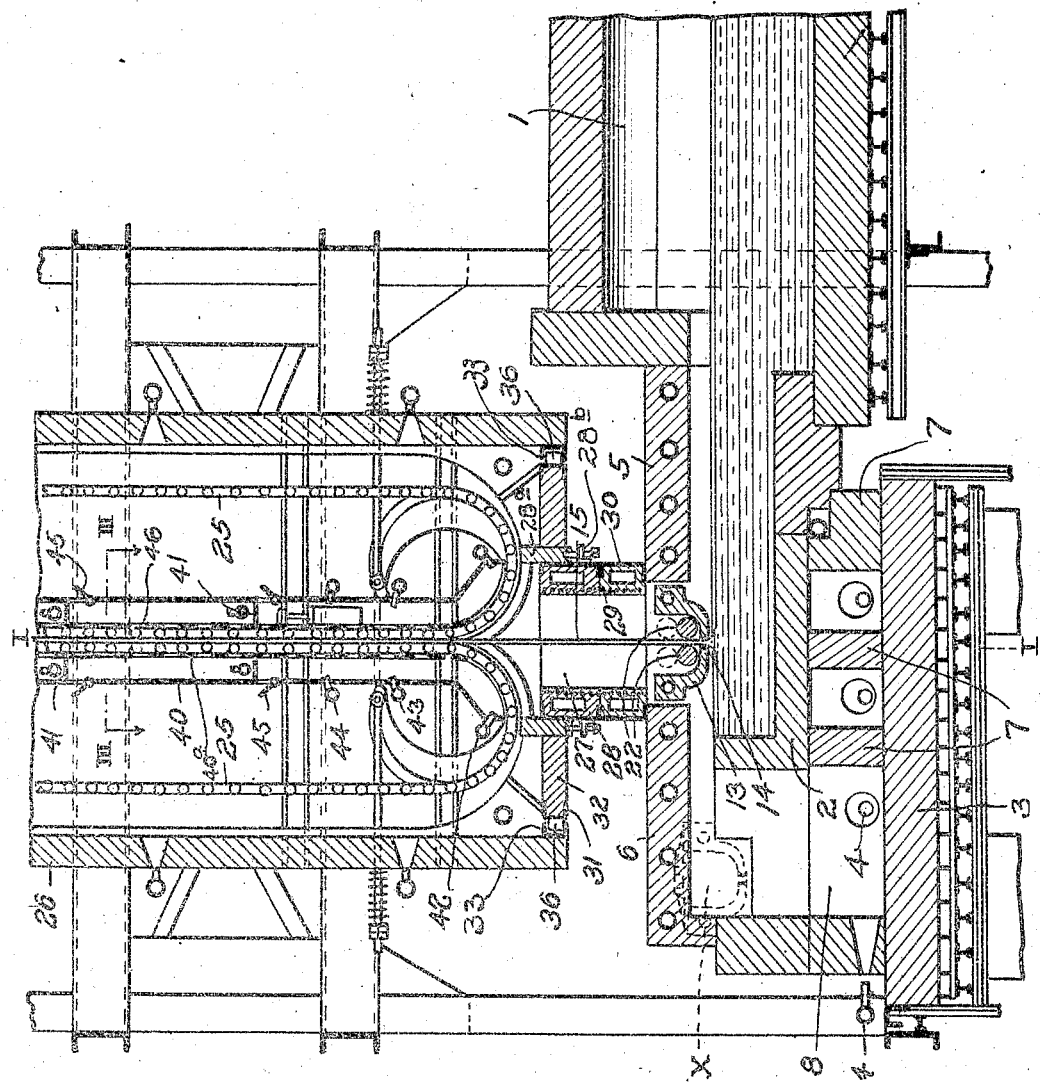

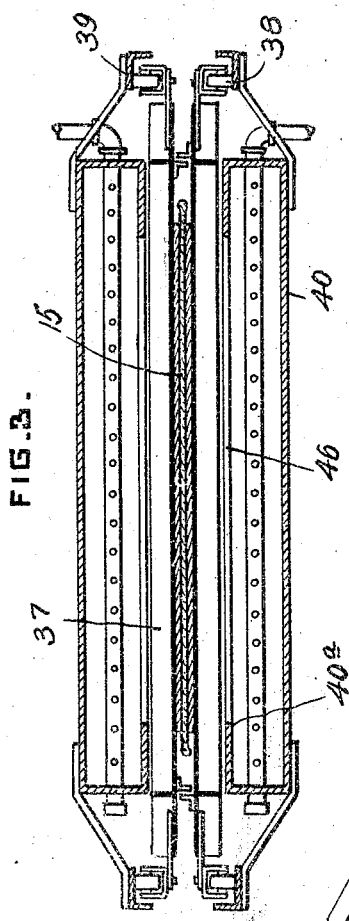
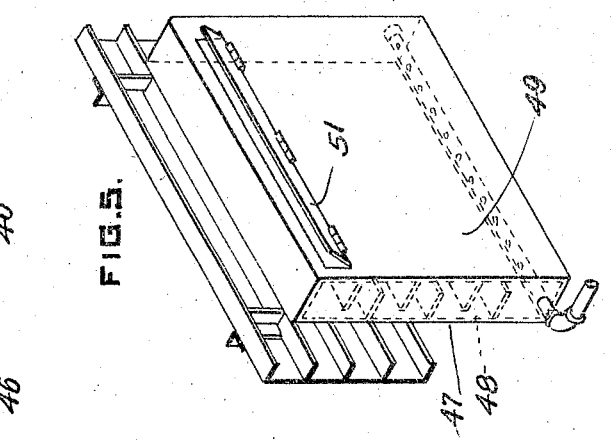
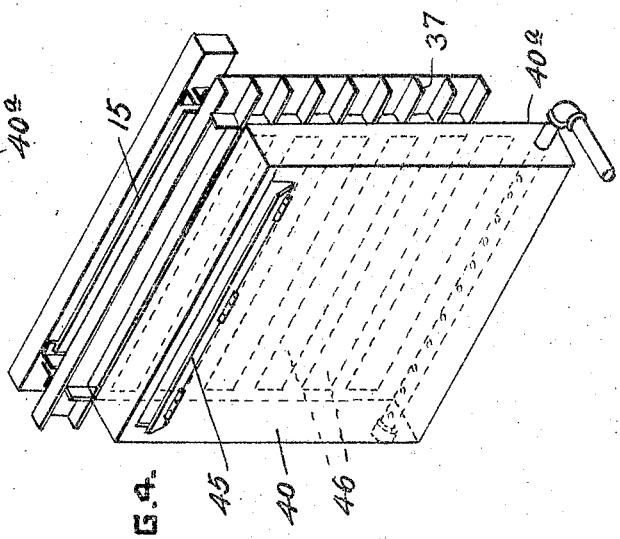

1,554,852

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

APPARATUS FOR MAKING SHEET GLASS.

Application filed December 26, 1924. Serial No. 758,168.

*To all whom it may concern:*

Be it known that I, HALBERT K. HITCHCOCK, a citizen of the United States, and a resident of Pittsburgh, in the county of Allegheny and State of Pennsylvania, have made a new and useful invention in Improvements in an Apparatus for Making Sheet Glass, of which the following is a specification.

The invention relates to an apparatus for making glass in a continuous sheet or ribbon, and involves an improvement over the construction illustrated in my pending application, Serial Number 593,719. The invention has to do with the arrangement permitting the removal and replacement of the refractory drawing basin, commonly referred to as the "slot member". It has for its principal object, the provision of an improved arrangement, whereby the drawing chamber located above the slot member may be shifted, when it becomes necessary to put the slot member into position of use, or to remove it from such position in preparing for a new drawing operation, and the provision of improved means for heating the drawing belts of the apparatus to prevent the glass from cooling too rapidly. Certain embodiments of the invention are illustrated in the accompanying drawings wherein:

Figure 1 is a partial front elevation and partial section on the line I—I of Fig. 2. Fig. 2 is a vertical section on the line II—II of Fig. 1. Fig. 3 is a transverse section on the line III—III of Fig. 2. Fig. 4 is a perspective view of a portion of the belt construction. And Fig. 5 is a perspective view of a modification.

Referring to the drawings, 1 is the end of a melting tank of the regenerative type communicating with a drawing pot or receptacle 2 located in an extension at one end of the melting tank. This extension comprises a bottom wall or floor 3, suitable side and end walls having perforations for the gas burners 4, and a cover consisting of the two sections 5 and 6. The drawing pot or receptacle 2 is supported on the refractory blocks 7, and the end of the pot is spaced away from the end wall of the furnace to provide a heating chamber 8 for the purpose hereinafter described.

The cover member 5 is fixed in position, but the other member 6 is mounted for horizontal movement, this being accomplished by supporting it on wheels on the track 9 carried by the eye beams 10. As indicated in Fig. 1, the cover member 6 is secured to horizontal channel bars 11 extending longitudinally of the furnace and provided with the wheels 12 resting upon the track 9.

Intermediate the cover sections 5 and 6 is the slot member 13 extending transversely of the drawing pot and being of the form indicated in Fig. 2 with a slot 14 through which the glass sheet 15 is drawn. This slot member 13 is made of refractory material such as clay, suitably reinforced and like the cover member 6 is mounted on a track so that it may be moved longitudinally of the furnace. This track is shown at 16 in Fig. 1 and consists of rails mounted upon the channels 17. The ends of the slot member are provided with castings 18 (Fig. 1) in which are mounted wheels 19 engaging the rails 16.

The slot member is also arranged so that it may be moved vertically to a position above the level of the cover member 6 to permit its being shifted over such cover member as hereinafter described, and this feature of vertical movement is accomplished by supporting the channels 17 which carry the rails 16, so that such channels may be raised and lowered. This is accomplished by suspending the channels 17 by means of a pair of cables 20 on each side of the furnace, such cables passing up over the pulleys 21 and to suitable winding drums (not shown), such drums being operated from electric motors or by any other suitable power means. As illustrated, the slot member 13 is provided with a pair of driven rolls 22 for sizing the sheet of glass drawn through the slot member, and such rolls are driven from the motor 23 operating through reducing mechanism 24 (Fig. 1) and suitable connecting shafts, the mechanism for accomplishing this result constituting no part of the present invention and being fully shown and described in my pending application, Serial No. 569,000.

The drawing of the sheet of glass is accomplished by means of a pair of endless belts 25 faced with asbestos for yieldingly engaging the glass and enclosed in a casing 26. The method of driving these belts and their construction is shown and described in my copending application, Serial No. 593,719, and the construction here is the same as that in such application, except as to the means employed for heating the inner flights of the belts, such means constituting one feature of the present invention and being later described in detail in connection with the illustration of Figs. 3 and 4. The glass passes between these belts at relatively high temperature and is gradually cooled and annealed so that it may be cut off and handled at the upper ends of the belts, the glass entering the belts at the bottom, however, at a temperature such that it has set so that it will not be marred by contact with the belts.

Located intermediate the drawing mechanism and the slot member 13 is a drawing chamber 27 having the refractory walls 28. These walls entirely close the space between the drawing mechanism and the top of the tank extension and are provided with electrically heated resistance elements 29, so that the temperature in the chamber may be regulated to suit requirements. The walls 28 are supported by transverse channel bars 30 and these channel bars are in turn supported by framework made up of the channel bars 31. This latter framework also carries the refractory members 32 which fit up into the bottom of the casing 26 of the drawing mechanism. Extending transversely through the lower end of the casing 26 are a pair of channel bars 33 suitably supported from the framework 34—35 and constituting a track for supporting the drawing chamber 27 when it is desired to move it laterally. Provision is made for supporting the channels 31 upon the channels 33 for relative movement by the use of the wheels 36 carried upon the channels 31 and engaging the flanges of the channels 33. This arrangement provides for the removal of the chamber 27 to one side of the drawing extension to provide clearance above the drawing extension for the positioning or removal of the slot member 13.

Before starting the drawing operation, it is necessary to bring the glass in the pot to a temperature most suitable for this purpose, and this is accomplished with the slot member 13 removed from the position in which it is shown in Fig. 2 and with the cover member 6 moved to the right from the position shown in Fig. 2, so that its inner end abuts the end of the cover member 5. At this time the slot member occupies the position indicated by the dotted lines in Fig. 2 and marked *x*, such slot member at this time filling the space left by moving the cover member 6 to the right. The positioning of the slot member in this way before the beginning of the drawing operation serves two purposes. It leaves the space above the surface of the glass in the drawing pot unobstructed, so that the glass in the pot may be readily and uniformly heated to the proper temperature for drawing, and it permits of the bringing of the slot member to a proper temperature before putting it in position for use since the space 8 acts as the heating chamber in which any desired temperature may be secured by a suitable regulation of the burners 4. At this time the drawing chamber 27 occupies a position on the track 33 (Fig. 1) at the left hand side of the tank extension, so that an unobstructed space is provided intermediate the lower end of the casing 26 and the cover members 5 and 6.

When it is desired to bring the parts to operative position as indicated in Fig. 2, the slot member 13 is first raised to a position above the level of the cover member 6 by lifting the channel bars 17 upon which the slot member is carried. The slot member is then moved along its track 16 until it arrives at the position above that illustrated in Fig. 2. The cover member 6 is then moved to the left on its track 9 to the position indicated in Fig. 2, thus providing a space between its inner end and the end of the cover member 5 for receiving the slot member. The channel bars 17 carrying the slot member are then lowered until the slot member arrives at the position indicated in Fig. 2. The drawing chamber 27 is then moved laterally from its position at the left of the drawing extension (Fig. 1) until it arrives at the position indicated in Figs. 1 and 2, at which time it fits into the space between the casing 26 of the drawing mechanism and the cover members 5 and 6, so that the apparatus is assembled and ready for use. The drawing operation is started in the usual way by the use of a bait which is dipped into the glass and passes upward between the drawing belts 25—25.

When it becomes necessary to remove the slot member for replacements or repairs or in order to permit of a remelting operation in the pot 2, the shifting operations as above described are reversed, the drawing chamber being moved to one side of the tank extension, after which the slot member is shifted back to the dotted line position and the cover member 6 moved to the right to close the space left by the removal of the slot member. When in the position indicated in dotted lines, the temperature in the chamber 8 may be raised to such a point that any old glass in the slot member is thoroughly melted out, thus bringing it into condition for further use. During this reheating operation as applied to the slot member, the rolls 12 and the reducing gearing carried by the slot member are preferably disconnected and removed to relieve them of the effect of this reheating operation which occurs at a relatively high temperature.

The belt construction and the means for heating the inner flights will be seen by reference to Fig. 1 in connection with Figs. 3 and 4. As in my copending application 593,719, heretofore referred to, the belts are made up of the U shaped members 37, having at intervals strips of asbestos for gripping the glass. They are secured at their ends to chain links carrying the rollers 38 which engage the vertical guides 39. Spaced to the rear of these members 37 which make up the belts, are the metal plates 40 and 40ᵃ with transverse division walls 41. Compartments are in this way provided at the backs of the belts, to which heat may be applied by means of the burners 42, 43, 44, etc., so that the glass sheet between the belts may be prevented from cooling too rapidly. The transverse partition walls 41 permit of the regulation of the temperatures along different portions of the belts independently, such temperature gradually decreasing as the belts progress upwardly. In the extreme upper reaches of the belts, the compartments may even be cooled rather than heated by the use of air blasts or other means. To provide for further regulation of the temperatures, the compartments are provided at their upper ends with the dampers 45, which can be opened more or less to allow the escape of the heated gases. The walls 40ᵃ are preferably slotted as indicated at 46 to permit the application of the heated gases directly to the backs of the U shaped members 37. A modification of the compartment structure back of the belts is shown in Fig. 5 in which the front plate or wall 47 corresponding to the wall 40ᵃ of Figs. 1 to 4 is not slotted, and the baffles 48 are employed projecting in staggered relation from the plates 47 and 49. This causes the heated gases from the burner 50 to pursue the zig-zag path as indicated, a regulating damper 51 being employed at the upper end of the compartment as in the other form of construction. In order to prevent the heat from the chamber 27 from passing to the rear of the endless belts, the blocks 28ᵃ are employed mounted for vertical adjustment on the brackets 28ᵇ. This adjustment takes care of the vertical movement of the belts due to varying heat conditions.

What I claim is:

1. Apparatus for drawing sheet glass, comprising a tank extension carrying a bath of molten glass, and having a cover provided with a transverse opening, a slot member mounted in said opening, means for supporting said slot member so that it may be moved vertically above the cover portion and then longitudinally of the extension, drawing and annealing mechanism located above the slot member, and a drawing chamber between said drawing mechanism and slot member mounted for movement laterally to provide clearance for the positioning and removal of the slot member.

2. Apparatus for drawing sheet glass, comprising a tank extension carrying a bath of molten glass, and having a cover provided with a transverse opening, a slot member mounted in said opening, means for supporting said slot member so that it may be moved vertically above the cover portion and then longitudinally of the extension, drawing and annealing mechanism located above the slot member, and a drawing chamber between said drawing mechanism and slot member mounted for movement transversely of the extension to a position at one side of such extension to provide clearance for the positioning and removal of said slot member.

3. Apparatus for drawing sheet glass, comprising a tank extension carrying a bath of molten glass, and having a cover provided with a transverse opening, a slot member mounted in said opening, means for supporting said slot member so that it may be moved vertically above the cover portion and then longitudinally of the extension, drawing and annealing mechanism located above the slot member, a drawing chamber between said mechanism and cover in line with said slot member, a track spaced above the cover and extending transversely of the extension, and means for supporting the drawing chamber upon said track so that it may be shifted laterally to a position to one side of the extension to provide clearance for the positioning and removal of the slot member.

4. Apparatus for drawing sheet glass, comprising a tank extension carrying a bath of molten glass, and having a heating chamber at the end thereof, a pair of cover members lying over said bath and said chamber, a slot member lying between the cover members, means for moving the slot member vertically and then horizontally over the top of one of the cover members to a position over said heating chamber, means whereby such last cover member may be shifted longitudinally of the tank extension, drawing and annealing mechanism located above the slot member, and a drawing chamber between the drawing mechanism and the slot member mounted for movement transversely of the extension.

5. A drawing device for sheet glass comprising a pair of opposing endless belts for receiving the glass therebetween, a temperature controlling chamber extending along the back of the inner flight of each belt from the bottom upwardly, and means for applying heat to such chamber to control its temperature and that of the belt flight.

6. A drawing device for sheet glass comprising a pair of opposing endless belts for receiving the glass therebetween, a series of temperature controlling chambers extending along the back of the inner flight of each belt from the bottom upwardly, and means for heating said chambers independently.

7. A drawing device for sheet glass comprising a pair of opposing endless belts for receiving the glass therebetween, a temperature controlling chamber extending along the back of the inner flight of each belt from the bottom upwardly, and having an outlet from its upper portion, a damper for said outlet, and means for applying heat to such chamber to control its temperature.

8. A drawing device for sheet glass comprising a pair of opposing endless belts for receiving the glass therebetween, a series of temperature controlling chambers extending along the back of the inner flight of each belt from the bottom upwardly, and means for controlling and regulating the temperatures of said chambers independently.

9. A drawing device for sheet glass comprising a pair of opposing endless belts for receiving the glass therebetween, a temperature controlling chamber extending around the bottom curve of each of the belts and upward at the back of the inner flight thereof, and means for applying heat to such chamber.

10. A drawing device for sheet glass comprising a pair of opposing endless belts for receiving the glass therebetween, a temperature controlling chamber extending along the back of the inner flight of each belt from the bottom upwardly, and means for applying heat to such chamber to control its temperature and that of the belt flight, the walls of the chamber next to the belt flights being perforated to permit the direct application of heat to the rear faces of the belts.

HALBERT K. HITCHCOCK.